United States Patent
Patel et al.

(10) Patent No.: US 9,525,661 B2
(45) Date of Patent: Dec. 20, 2016

(54) EFFICIENT METHOD OF NAT WITHOUT REASSEMLING IPV4 FRAGMENTS

(71) Applicant: Alcatel-Lucent Canada Inc., Ottawa (CA)

(72) Inventors: Nirmesh Patel, Kanata (CA); Gajendran Kanapathipillai, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 200 days.

(21) Appl. No.: 14/478,406

(22) Filed: Sep. 5, 2014

(65) Prior Publication Data

US 2016/0072767 A1    Mar. 10, 2016

(51) Int. Cl.
*H04L 29/12*    (2006.01)
*H04L 29/06*    (2006.01)

(52) U.S. Cl.
CPC ....... *H04L 61/2514* (2013.01); *H04L 29/0653* (2013.01); *H04L 29/12452* (2013.01); *H04L 61/256* (2013.01); *H04L 61/2557* (2013.01)

(58) Field of Classification Search
CPC ............. H04L 61/2575; H04L 61/2557; H04L 61/6018; H04L 61/256; H04L 61/2514; H04L 61/2567; H04L 29/12452

See application file for complete search history.

(56) References Cited

U.S. PATENT DOCUMENTS

| | | | | |
|---|---|---|---|---|
| 5,740,171 A | * | 4/1998 | Mazzola | H04L 12/18 370/392 |
| 5,920,900 A | * | 7/1999 | Poole | G06F 17/30949 707/E17.036 |
| 6,266,705 B1 | * | 7/2001 | Ullum | H04L 12/467 709/238 |
| 6,754,662 B1 | * | 6/2004 | Li | G06F 17/30949 707/693 |

(Continued)

OTHER PUBLICATIONS

Snoeren, Alex C., et al. "Hash-based IP traceback." ACM SIGCOMM Computer Communication Review. vol. 31. No. 4. ACM, 2001.*

(Continued)

*Primary Examiner* — Jimmy H Tran
(74) *Attorney, Agent, or Firm* — Kramer & Amado, P.C.

(57) ABSTRACT

A method, apparatus, and machine readable storage medium is disclosed for performing network address translation (NAT) on fragments of a Internet Protocol (IP) packet, comprising: receiving a packet fragment of the packet; calculating a hash key based on a subset of header information in the fragment; if the packet fragment is the first fragment of the packet; initiating a NAT session for the packet; storing the NAT session identifier at an entry in the linked list indexed by the hash key; and if the packet fragment is not the first fragment of the packet, then: retrieving a NAT session identifier, if available, at an entry in said linked list indexed by said hash key; and performing NAT on the fragment using the NAT session identified by the NAT session identifier. The hash key is a subset of a CRC32

(Continued)

calculation performed on: IPv4 source address; IPv4 destination address; and IP Identifier of the fragment. If the indexed entry in the linked list is not available, accessing a second dimension of the linked list.

18 Claims, 5 Drawing Sheets

(56) References Cited

U.S. PATENT DOCUMENTS

| | | | |
|---|---|---|---|
| 6,944,672 B2 * | 9/2005 | Crow | H04L 29/06 370/473 |
| 7,359,983 B1 * | 4/2008 | Maufer | H04L 29/12377 709/217 |
| 7,769,858 B2 * | 8/2010 | Corl, Jr. | H04L 29/12009 709/225 |
| 7,835,356 B2 | 11/2010 | Bar-Kovetz | |
| 8,320,372 B2 | 11/2012 | Menten | |
| 8,942,235 B1 * | 1/2015 | Vinapamula Venkata | H04L 63/02 370/254 |
| 2003/0142823 A1 * | 7/2003 | Swander | H04L 29/1249 380/277 |
| 2003/0165196 A1 * | 9/2003 | Demas | H04N 5/76 375/240.25 |
| 2006/0023744 A1 * | 2/2006 | Chen | H04L 29/12009 370/466 |
| 2009/0110003 A1 | 4/2009 | Julien | |
| 2011/0047256 A1 * | 2/2011 | Babu | H04L 29/12367 709/223 |
| 2012/0250687 A1 * | 10/2012 | Cao | H04L 45/02 370/392 |
| 2012/0257628 A1 * | 10/2012 | Bu | H04L 61/2514 370/392 |
| 2013/0091303 A1 * | 4/2013 | Mitra | H04L 61/2557 709/238 |
| 2013/0275391 A1 * | 10/2013 | Batwara | G06F 17/30085 707/689 |
| 2016/0072767 A1 * | 3/2016 | Patel | H04L 61/2514 709/245 |

OTHER PUBLICATIONS

Kivinen, Tero, et al. Negotiation of NAT—Traversal in the IKE. No. RFC 3947. 2004.*

Sanchez, Luis A., et al. "Hardware support for a hash-based IP traceback." DARPA Information Survivability Conference & Exposition II, 2001. DISCEX'01. Proceedings. vol. 2. IEEE, 2001.*

Grosse, Eric, and Y. N. Lakshman. "Network processors applied to IPv4/IPv6 transition." IEEE network 17.4 (2003): 35-39.*

* cited by examiner

EFFICIENT METHOD OF NAT WITHOUT REASSEMLING IPV4 FRAGMENTS

FIELD OF INVENTION

The invention relates to communications, specifically the routing and filtering of packets within digital communications networks.

BACKGROUND

On a packet-switched network such as the Internet, traffic between a source and a destination is in the form of one or more discrete units, or datagrams. The creation of datagrams is typically performed by a number of software protocols working in coordination. These protocols are typically visualized as a vertical stack of layers. Each layer/protocol accepts a datagram from an adjacent layer/protocol, performs a specific set of one or more tasks on that datagram, and then delivers the resulting datagram to the next layer/protocol in the stack.

NAT (Network Address Translation) is a functionality of a router that allows binding of private IP addresses to public IP address. Another advantage of NAT is that it allows minimizing IPv4 address space required in a network by segmenting network into independent Network segments. NAT functionality requires parsing IPv4 packet to layer 4 fields. These layer 4 fields along with IPv4 address creates unique address which can be assigned to a host or to a network. For example:

Private IP Address 192.168.1.100 maps to public IP address 138.120.1.100 port 2000
Private IP Address 192.168.1.101 maps to public IP Address 138.120.1.100 port 2001
Private IP Address 192.168.1.102 maps to public IP Address 138.120.1.100 port 2002

During the course of routing IP datagrams, it is occasionally necessary to break such datagrams into a sequence of smaller IP datagrams, for example, to meet the constraints of an intermediate network or router in the transmission path. This operation is called IP packet fragmentation. Such a constraint can be defined by a Maximum Transmission Unit (MTU) parameter configured on a router. An unfragmented IP datagram is called a packet, and each smaller IP datagram that results from breaking up a packet is called a packet fragment (or fragment).

IPv4 fragmentation (described in IETF publication RFC 791) is a process by which a single IPv4 packet can be segmented into multiple IPv4 packet fragments. Since the IPv4 fragmentation process only duplicates the IPv4 header, without layer 4 header (i.e.: transport layer, e.g.: Terminal Control Protocol (TCP) header or User Datagram Protocol (UDP) header), only the first fragment of the original packet contains layer 4 header. Subsequent fragments do not contain layer 4 header. A first fragment is defined as having "More Fragments" ("MF") equal to 1 and Fragment Offset ("offset") equal 0 in the IPv4 header. Subsequent fragments of the packet are defined as having "offset" equal non-zero value in the IPv4 header. The last fragment of a packet is defined as having "MF" equal to zero in the IPv4 header and "offset" equal to a non-zero value.

Figure 1:
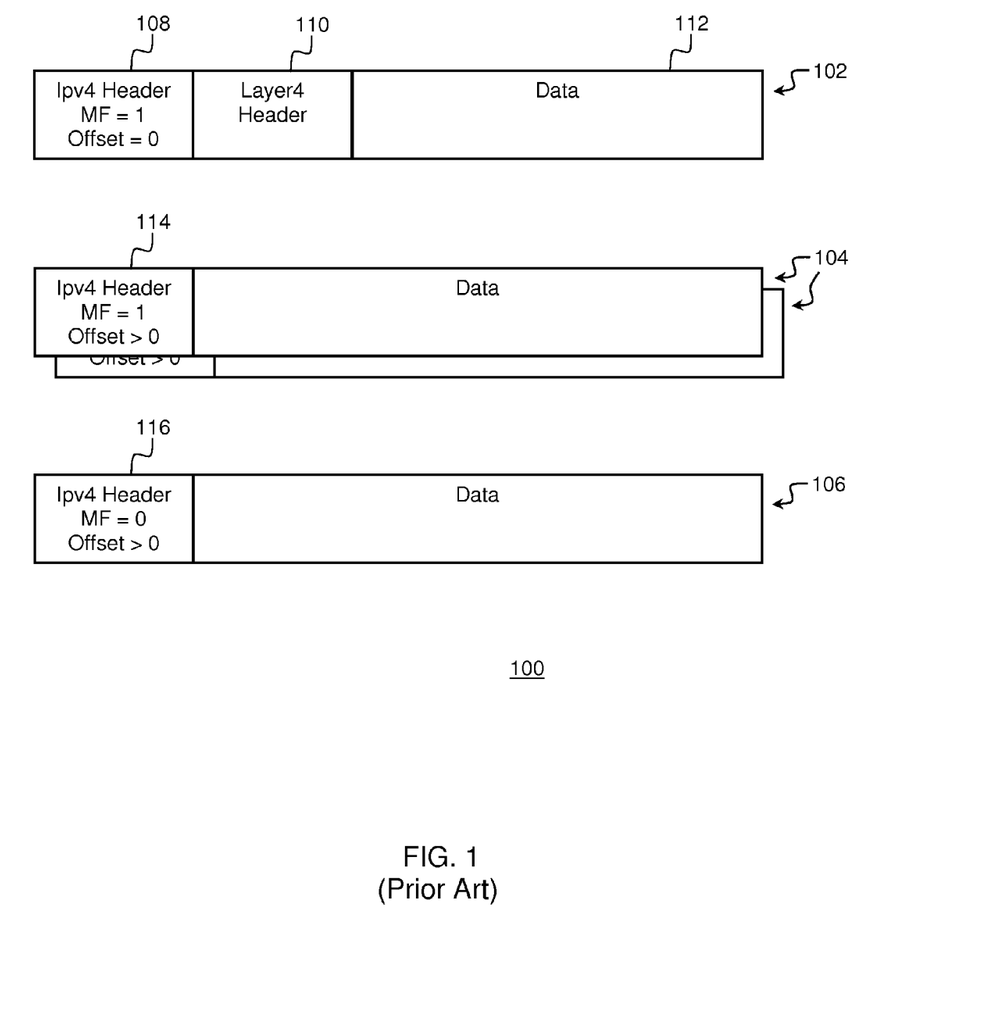
FIG. 1 illustrates a fragmented Ipv4 packet as known in the art.

FIG. 1 illustrates a fragmented IPv4 packet 100. Packet 100 is fragmented into packet fragments 102, 104, 106. First packet fragment 102 contains IPv4 Header 108, layer 4 header 110 and data 112. Middle packet fragments 104 and the last packet fragment 106 do not contain a layer 4 header.

Since it is possible to have packet fragments in a NAT router, fragments of a packet must typically be reassembled into a complete packet prior to performing a NAT operation, in order to associate the layer 4 header information with each of the packet fragments. Generally it is very demanding on resources to reassemble the packet and then perform a NAT operation on the packet. Therefore, improvements to NAT routers to improve the efficiency of a NAT operation on packet fragments is highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for performing network address translation (NAT) on fragments of a Internet Protocol (IP) packet. The method comprises: receiving a packet fragment of the packet; determining if the packet fragment is the first fragment of the packet; if the packet fragment is the first fragment of the packet, then: initiating a NAT session for the packet, the NAT session having a NAT session identifier; performing NAT on the fragment using the NAT session; calculating a hash key based on a subset of header information in the fragment; and storing the NAT session identifier at an entry in the linked list indexed by the hash key, and if the packet fragment is not the first fragment of the packet, then: calculating a hash key based on a subset of header information in the fragment; retrieving a NAT session identifier, if available, at an entry in the linked list indexed by the hash key; and performing NAT on the fragment using the a NAT session identified by the NAT session identifier.

In various alternative embodiments, the subset of header information is unique to the packet.

In various alternative embodiments, the packet comprises an IPv4 packet and the subset of header information comprises: IPv4 source address; IPv4 destination address; and IP Identifier.

In various alternative embodiments, the calculating a hash key comprises calculating a cyclical-redundancy-check-32 (CRC-32) on the subset of header information.

In various alternative embodiments, the calculating a hash key further comprises using a subset of the CRC-32.

In various alternative embodiments, the storing is performed if the entry in the linked list is available, and if the entry in the linked list is unavailable, then storing the NAT session identifier at an entry in a second dimension of the linked list.

In various alternative embodiments, the entry in the linked list is unavailable if a validity flag is set and if a timeout value has not expired.

Various alternative embodiments further comprise, if the entry is available: a step of setting the validity flag and setting the timeout value.

Other embodiments of the invention provide an apparatus for performing network address translation (NAT) on fragments of a Internet Protocol (IP) packet. The apparatus comprises: a receiver for receiving a packet fragment of the packet; a linked list memory structure; a processor configured to: receive a fragment of a packet via the receiver; determine if the packet fragment is the first fragment of the packet; and if the packet fragment is the first fragment of the packet, then: initiate a NAT session for the packet, the NAT session having a NAT session identifier; perform NAT on the fragment using the NAT session; calculate a hash key based on a subset of header information in the fragment; and store the NAT session identifier at an entry in the linked list, indexed by the hash key, and if the packet fragment is not the first fragment of the packet, then: calculate a hash key based on a subset of header information in the fragment; retrieve a NAT session identifier, if available, at an entry in the linked list, indexed by the hash key; and perform NAT on the fragment using the NAT session identified by the NAT session identifier.

In various alternative embodiments, the processor is configured to calculate the hash key by calculating a cyclical-redundancy-check-32 (CRC-32) on the subset of header information.

In various alternative embodiments, the processor is further configured to calculate the hash key by using a subset of the CRC-32.

In various alternative embodiments, the linked list is implemented in double data rate synchronous dynamic random-access memory (DDR RAM).

Other embodiments of the invention provide a tangible and non-transitory machine-readable storage medium encoded with instructions thereon for execution by a network node, wherein the tangible and non-transitory machine-readable storage medium comprises instructions for: receiving a packet fragment of the packet; determining if the packet fragment is the first fragment of the packet; if the packet fragment is the first fragment of the packet, then: initiating a NAT session for the packet, the NAT session having a NAT session identifier; performing NAT on the fragment using the NAT session; calculating a hash key based on a subset of header information in the fragment; storing the NAT session identifier at an entry in the linked list indexed by the hash key; and if the packet fragment is not the first fragment of the packet, then: calculating a hash key based on a subset of header information in the fragment; retrieving a NAT session identifier, if available, at an entry in the linked list indexed by the hash key; and performing NAT on the fragment using the a NAT session identified by the NAT session identifier.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Referring now to the drawings, in which like numerals refer to like components or steps, there are disclosed broad aspects of various exemplary embodiments.

In use, embodiments of the invention are situated in a piece of network equipment which acts as a node in a network of network equipment. In operation the network elements communicate via connections which bind the individual network element to other network elements to form the overall network. Embodiments described refer to a network address translation (NAT) router. It should be understood that the description could apply equally to other network nodes providing routing services and network nodes providing network address translation services.

Over the last few years the cost of Double Data Rate random access memory (DDR RAM) has came down in the price. However memory bandwidth has not improved significantly compared to the capacity, which puts a heavy demand on protecting memory bandwidth to gain performance. Disclosed embodiments utilize a Cyclic Redundancy Check (CRC32) as a hash function to efficiently associate fragments of a packet, in order to facilitate network address translation of packet fragments without requiring reassembly of the packet fragments.

Disclosed embodiments assume that the first fragment of a fragmented IPv4 packet is received by a NAT router before other fragments of the IPv4 packet and that it contains all the layer 4 fields required to perform the NAT operation. In most NAT routers, this is usually the case for the majority of fragmented packets, therefore this working assumption allows for a more streamlined and efficient process. A hash function is performed on the first fragment to enable subsequently processed fragments of the same packet to be associated efficiently with the first fragment and to undergo the same the NAT operation, as will be described in detail below. Subsequent packet fragments of the same packet can be processed in any order.

Figure 3:
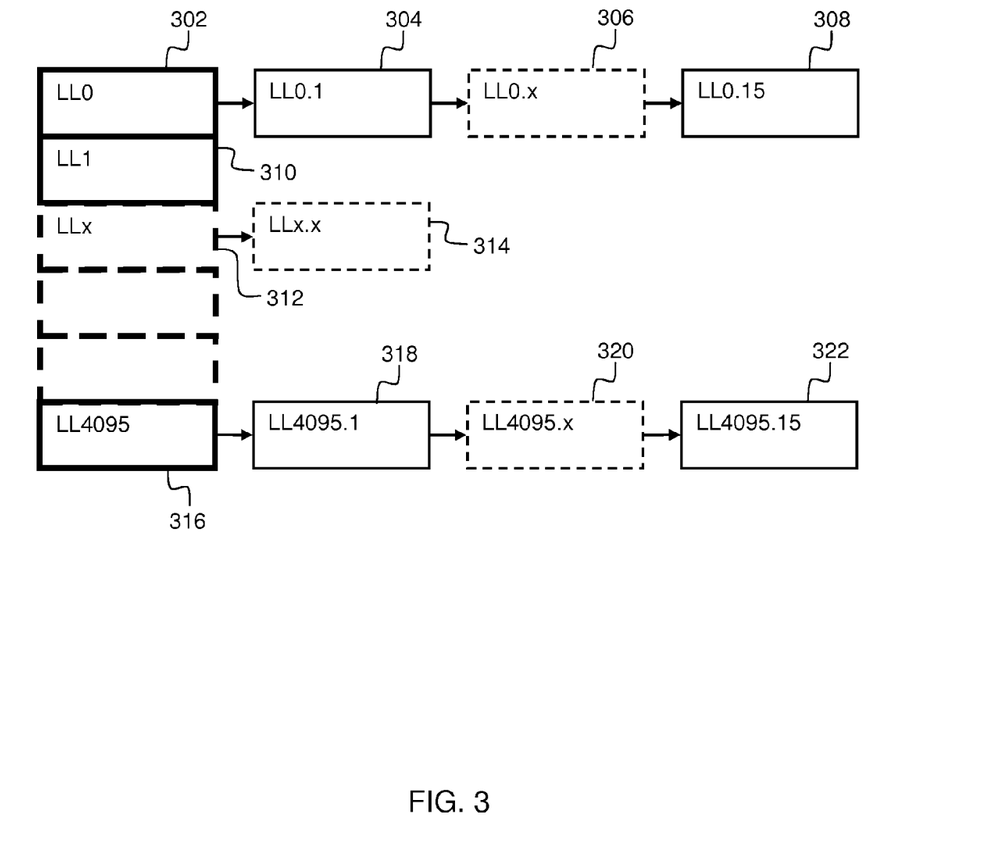
FIG. 3 illustrates a logical arrangement of a two-dimensional linked list according to an embodiment of the invention.

A CRC32 operation is used as a hash function as follows: a CRC32 operation is performed on representative fields of an IPv4 packet fragment to generate compressed bit fields to track packets in a two-dimensional linked list in memory. A statically allocated and pre-linked two-dimensional link list in high-speed Random Access Memory (RAM) (e.g.: DDR RAM) is used, which can save significant amount of memory access during the runtime processing of IPv4 packet fragments. FIG. 3 illustrates a logical arrangement of a two-dimensional linked list, which will be described in detail below.

A linked list is used to store reference to NAT sessions associated with individual packets, to be used when processing fragments of those packets. Header information in packet fragments that is unique to each packet is used to associate the fragments of a packet with a NAT session specific to that packet so that they can be processed individually without requiring re-assembly of the packet. A subset of the IPv4 header of each packet fragment, including: IPv4 source address; IPv4 destination address; and IP Identifier, is used to create a hash key, by performing a CRC-32 operation on the selected header information and then the least significant 12 bits are used as a pointer into a table implemented as a linked list. The 12 bits provide 4096 possible values as a pointer into a linked list. Thus, a table with 4096 entries can be supported. Because the CRC32 compresses 80 bits into 32 bits, and only the 12 least significant bits (a subset) of the 32 bits are used to further index into the linked list, there is possibility of collision, i.e., two unrelated packet fragments could have the same linked list index. To handle collision due to this compression, a second dimension of the linked list is maintained to manage collided packets. Thus, if an entry indexed by a hash key is already in use, then a second dimension of the linked list is accessed.

Figure 2:
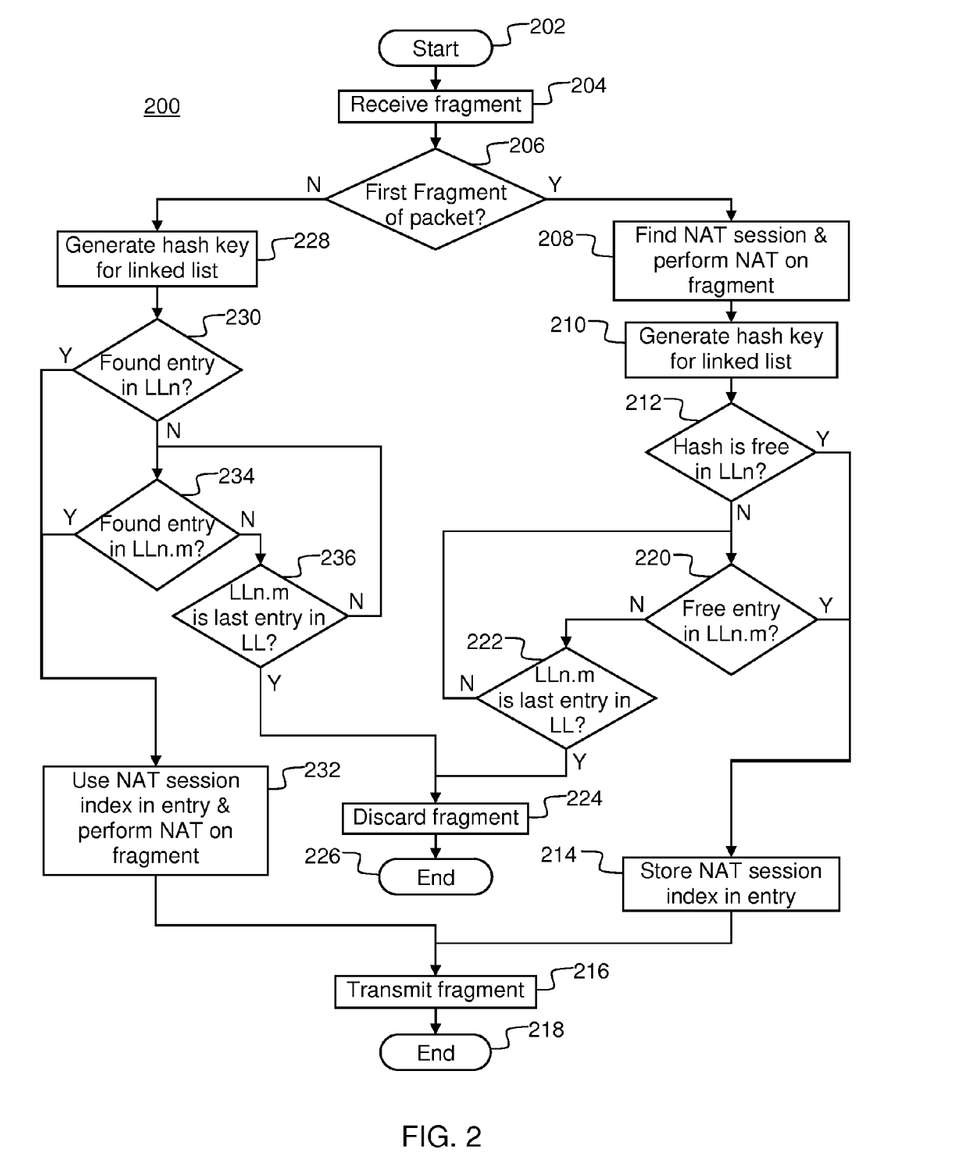
FIG. 2 illustrates a process flow diagram according to an embodiment of the invention.

FIG. 2 illustrates a flow chart for processing IPV4 fragmented packets in a NAT router. The process 200 starts at step 202. At step 204, the NAT router receives a packet fragment. At step 206, the NAT router determines if the received fragment is the first fragment of a packet. This can be done by determining if within the IPv4 header of the fragment, the MF (more fragments) bit is set to 1 and the Offset value=0 as seen in 108 of FIG. 1. If the received fragment is the first fragment of the packet, then the process proceeds to step 208 where the NAT router creates a NAT session and performs NAT on the fragment. The NAT session will be identified by a NAT session index which will be used further in the process, for processing subsequent fragments of the same packet.

At step 210, the NAT router generates a hash key, to represent the NAT session (NAT session index) associated with the packet fragment, to be used as a pointer into a linked list. The hash key is created by performing a CRC32 operation on a subset of the IPv4 header of the fragment that is common to all of the fragments of the same packet, to uniquely identify the packet. The 12 least significant bits of the CRC-32 value are used as a pointer into a linked list.

At step 212, the NAT router determines if the entry in the linked list, indexed (pointed to) by the hash key, is available for use, by determining if it is marked as invalid or if entry has timed out. An entry can be considered invalid if a "valid" flag is set to zero, for example. An entry can be considered timed-out if a time stamp (timeout value) stored in the entry is lower than the current time. If the entry indexed by the hash key is available for use then the process proceeds to step 214 where the NAT router populates the entry by storing the NAT session index in the entry, setting the valid flag in the entry, storing the IPV4 source address in the entry, storing the IPV4 destination address in the entry, storing the IP Identifier in the entry, storing the NAT session identifier in the entry, storing the state information, and entering a reassembly time-out value (timestamp) in the entry, representing a time, after which the packet fragment is considered expired and will be discarded. The timeout value is configurable and provides reassembly timeout to the user. A second function of the timeout value is to facilitate a cleanup operation as the process steps through entries in the linked list, as will be described below.

At step 216 the NAT router completes the NAT process and transmits the packet fragment. The process for the current packet fragment then ends at step 218.

If at step 212, the NAT router determines that the entry indexed by the hash key is not available for use then the process proceeds to step 220, where the NAT processor steps through a second dimension of the indexed entry in the linked list and determines if the next entry is available for use (free entry), i.e., the entry is flagged as invalid or the timeout value has expired). If a free entry is found then the process proceeds to step 214 where the NAT session identifier and other data is stored in the linked list entry as previously described.

Note that generally, the first entry is available because some of the fields used for CRC32 change. Since each fragmented packet from same source and destination increments the IP Identifier, entries in the linked list are usually well distributed.

If at Step 220, the entry is not available for use, then the process proceeds to step 222 where the NAT router determines if the current entry is the last entry in the second dimension of the linked list. In some embodiments, the depth of the second dimension is set at 16, thus being able to accommodate up to 16 different packets having the same hash key (index). If at step 222 the NAT router determines that the current entry is not the last entry in the second dimension then the process returns to step 220 where the NAT router steps to the next entry in the second dimension of the linked list entry and determines if this entry is a free entry (available for use), as described previously. If at step 222 the NAT router determines that the current entry is the last entry in the second dimension then the process proceeds to step 224 where the NAT router discards the packet fragment and the process ends at step 226.

If at step 206, the NAT router determines that the received fragment is not the first fragment of a packet then the process proceeds to step 228 where the NAT router generates a hash key by performing a CRC32 operation on a subset of the IPv4 header of the fragment, and uses the 12 least significant bits to represent the NAT session, similarly to step 210. In the following steps, the process will look for a NAT session corresponding to the first fragment of the corresponding packet and which would be applicable to all of the fragments of the same packet.

In step 230 the NAT router determines if a valid, matching entry exists in the linked list by using the hash key as an index into the linked list. The entry pointed to by the hash key is evaluated to determine if it is a valid, matching entry by determining: if the entry has the valid flag set; if the timeout value has not expired; and if the stored IPV4 source address, IPV4 destination address and IP Identifier match the IPV4 source address, IPV4 destination address and IP Identifier of the current packet fragment. If the stored entry is a valid, matching entry, which implies that the contents of the entry contain the NAT session information required to perform the NAT operation with the correct addressing information for the fragment, which was stored previously at step 214 when processing the first fragment of the same packet, then the process proceeds to step 232 where the NAT router performs a NAT operation using the NAT session information stored in the entry: the NAT session index, the IPV4 source address, the IPV4 destination address, the IP Identifier, the NAT session identifier, associated state information.

The process then proceeds to step 216, where the NAT router completes the NAT process and transmits the packet fragment. The process then ends at step 218.

If at step 230 the NAT router determines that the entry pointed to by the hash key is not a valid, matching entry, then the process proceeds to step 234 where the NAT router steps through a second dimension of the indexed entry in the linked list and determines if the next entry is a valid, matching entry and if so, the process proceeds to step 232 as described above. If at step 234, the entry is not a valid, matching entry, then the process proceeds to step 236 where the NAT processor determines if the current entry is the last entry in the second dimension, and if the NAT processor determines that the current entry is not the last entry in the second dimension, then the process returns to step 234 as described above. If at step 236 the NAT processor determines that the current entry is the last entry in the second dimension, then the process proceeds to step 224 where the NAT router discards the packet fragment and the process ends at step 226.

While accessing the linked list and while walking through the second dimension of the linked list, if timed-out entries are found, (i.e., if the timeout value is less than the value of the current time, then the NAT router marks the entries as invalid. In this manner, the NAT router dynamically cleans up expired entries without requiring a separate background process, which would require additional memory accesses. The timeout values are large and very accurate, comprising two parts: seconds and nanoseconds, to avoid roll-over processing to save run time cycles for efficiency reasons. An exemplary timeout value is 1 second, i.e., the time stamp is set to 1 second greater than the current time.

An exemplary NAT router is built on a distributed architecture comprising a forwarding plane and a control plane. For NAT IPv4 packet handling, the forwarding plane is responsible for processing IP data at line rate. The control plane manages NAT sessions and also initializes/programs the RAM needed by the forwarding plane. The control plane also programs desired reassembly timeout into the RAM. Since this value is very small (for example, 8 bytes in total), static RAM is used to save memory access latency.

FIG. 3 illustrates a logical arrangement of a two-dimensional linked list according to an embodiment of the invention. The linked list is structured to have 4096 direct entries, e.g.: "LL0" (302), "LL1" (310), "LLx" (312), "LL4095" (316) which can be addressed directly using a 12 bit index (hash key) as described above. If during the process of FIG. 2, the first entry is not available for use, the process steps through the second dimension of the linked list. For example, if the hash key is "0" (zero), this would point to entry "LL0" (302). If this entry was not available for use, then the process would step through "LL0.1" (304), "LL0.x" (306), etc., up to "LL0.15" (308) until an available entry was found.

Figure 4:
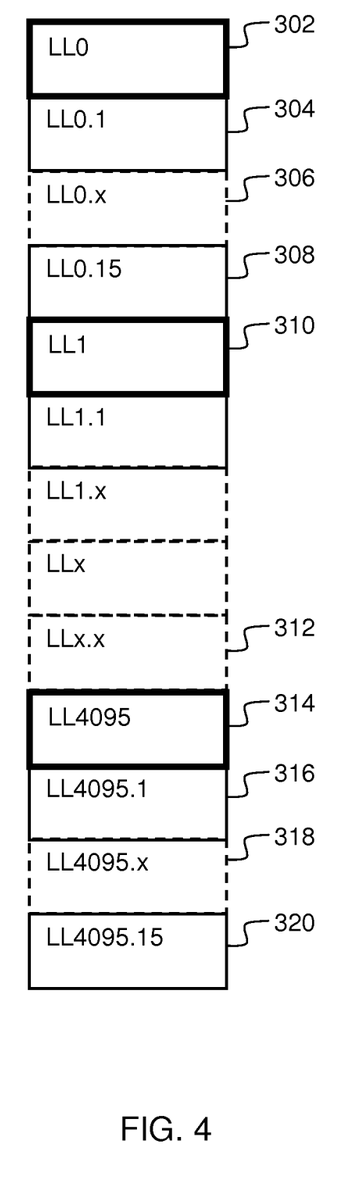
FIG. 4 illustrates a physical arrangement of the two-dimensional linked-list of FIG. 3.

FIG. 4 illustrates a physical arrangement of the two-dimensional linked list of FIG. 3. The logical arrangement of FIG. 3 is physically implemented in a linear fashion to minimize linked list pointer manipulation in order to optimize memory bandwidth. The reference numbers of FIG. 4 correspond to the reference numbers of FIG. 3. The control plane is responsible for initializing the linked list.

Figure 5:
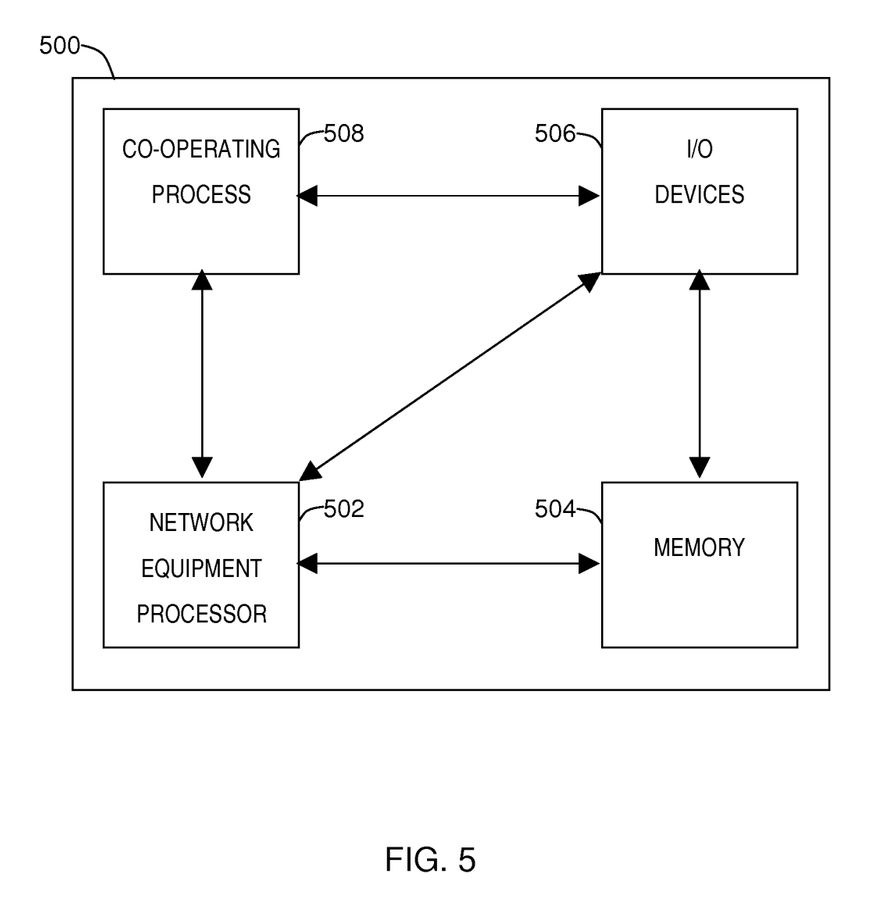
FIG. 5 illustrates high-level block diagram of a network equipment processor assembly suitable for embodiments of the invention.

FIG. 5 depicts a high-level block diagram of a network equipment processor assembly suitable for use in performing functions described herein.

As depicted in FIG. 5, network equipment processor assembly 500 includes a network equipment processor element 502 (e.g., a central processing unit (CPU) and/or other suitable processor(s)), a memory 504 (e.g., random access memory (RAM), read only memory (ROM), and the like), a cooperating module/process 508, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 508 can be loaded into memory 504 and executed by network equipment processor 502 to implement the functions as discussed herein. As well, cooperating process 508 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method for performing network address translation (NAT) on fragments of a Internet Protocol (IP) packet, the method comprising:
   receiving a packet fragment of said packet;
   determining if said packet fragment is the first fragment of said packet;
   if said packet fragment is the first fragment of said packet, then:
      initiating a NAT session for said packet, said NAT session having a NAT session identifier;
      performing NAT on said fragment using said NAT session;
      calculating a hash key based on a subset of header information in said fragment; and
      storing said NAT session identifier at an entry in said linked list indexed by said hash key, and
   if said packet fragment is not the first fragment of said packet, then:
      calculating a hash key based on a subset of header information in said fragment;
      retrieving a NAT session identifier, if available, at an entry in said linked list indexed by said hash key; and
      performing NAT on said fragment using said a NAT session identified by said NAT session identifier.

2. The method of claim 1, wherein said subset of header information is unique to said packet.

3. The method of claim 2, wherein said packet comprises an IPv4 packet and said subset of header information comprises: IPv4 source address; IPv4 destination address; and IP Identifier.

4. The method of claim 3, wherein said calculating a hash key comprises calculating a cyclical-redundancy-check-32 (CRC-32) on said subset of header information.

5. The method of claim 4, wherein said calculating a hash key further comprises using a subset of said CRC-32.

6. The method of claim 1, wherein said storing is performed if said entry in said linked list is available, and if said entry in said linked list is unavailable, then storing said NAT session identifier at an entry in a second dimension of said linked list.

7. The method of claim 6, wherein said entry in said linked list is unavailable if a validity flag is set and if a timeout value has not expired.

8. The method of claim 6, wherein if said entry is available, further comprising setting said validity flag and setting said timeout value.

9. An apparatus for performing network address translation (NAT) on fragments of a Internet Protocol (IP) packet, said apparatus comprising:
   a receiver for receiving a packet fragment of said packet;
   a linked list memory structure;
   a processor configured to:
      receive a fragment of a packet via said receiver;
      determine if said packet fragment is the first fragment of said packet; and if said packet fragment is the first fragment of said packet, then:
         initiate a NAT session for said packet, said NAT session having a NAT session identifier;
         perform NAT on said fragment using said NAT session;
         calculate a hash key based on a subset of header information in said fragment; and
         store said NAT session identifier at an entry in said linked list, indexed by said hash key, and
      if said packet fragment is not the first fragment of said packet, then:
         calculate a hash key based on a subset of header information in said fragment;
         retrieve a NAT session identifier, if available, at an entry in said linked list, indexed by said hash key; and
         perform NAT on said fragment using said NAT session identified by said NAT session identifier.

10. The apparatus of claim 9, wherein said subset of header information is unique to said packet.

11. The apparatus of claim 10, wherein said packet comprises an IPv4 packet and said subset of header information comprises: IPv4 source address; IPv4 destination address; and IP Identifier.

12. The apparatus of claim 11, wherein said processor is configured to calculate said hash key by calculating a cyclical-redundancy-check-32 (CRC-32) on said subset of header information.

13. The apparatus of claim 12, wherein said processor is further configured to calculate said hash key by using a subset of said CRC-32.

14. The apparatus of claim 9, wherein said storing is performed if said entry in said linked list is available, and if said entry in said linked list is unavailable, then storing said NAT session identifier at an entry in a second dimension of said linked list.

15. The apparatus of claim 14, wherein said entry in said linked list is unavailable if a validity flag is set and if a timeout value has not expired.

16. The apparatus of claim 14, wherein if said entry is available, further comprising setting said validity flag and setting said timeout value.

17. The apparatus of claim 9, wherein said linked list is implemented in double data rate synchronous dynamic random-access memory (DDR RAM).

18. A tangible and non-transitory machine-readable storage medium encoded with instructions thereon for execution by a network node, wherein the tangible and non-transitory machine-readable storage medium comprises instructions for:
   receiving a packet fragment of said packet;
   determining if said packet fragment is the first fragment of said packet;
   if said packet fragment is the first fragment of said packet, then:

initiating a NAT session for said packet, said NAT session having a NAT session identifier;

performing NAT on said fragment using said NAT session;

calculating a hash key based on a subset of header information in said fragment;

storing said NAT session identifier at an entry in said linked list indexed by said hash key; and if said packet fragment is not the first fragment of said packet, then:

calculating a hash key based on a subset of header information in said fragment;

retrieving a NAT session identifier, if available, at an entry in said linked list indexed by said hash key; and performing NAT on said fragment using said a NAT session identified by said NAT session identifier.

\* \* \* \* \*

UNITED STATES PATENT AND TRADEMARK OFFICE
CERTIFICATE OF CORRECTION

PATENT NO. : 9,525,661 B2  
APPLICATION NO. : 14/478406  
DATED : December 20, 2016  
INVENTOR(S) : Nirmesh Patel et al.

Page 1 of 1

It is certified that error appears in the above-identified patent and that said Letters Patent is hereby corrected as shown below:

On the Title Page

Item [54] and in the Specification, Column 1, Title should read as follows:
--EFFICIENT METHOD OF NAT WITHOUT REASSEMBLING IPV4 FRAGMENTS--

Signed and Sealed this
Fourth Day of April, 2017

Michelle K. Lee
*Director of the United States Patent and Trademark Office*